(12) United States Patent
Markus et al.

(10) Patent No.: US 10,346,267 B2
(45) Date of Patent: Jul. 9, 2019

(54) REGISTERING DATA MODIFICATION LISTENER IN A DATA-GRID

(71) Applicant: Red Hat, Inc., Raleigh, NC (US)

(72) Inventors: Mircea Markus, London (GB); William Rosenquist Burns, Annapolis, MD (US)

(73) Assignee: RED HAT, INC., Raleigh, NC (US)

( * ) Notice: Subject to any disclaimer, the term of this patent is extended or adjusted under 35 U.S.C. 154(b) by 1043 days.

(21) Appl. No.: 14/609,333

(22) Filed: Jan. 29, 2015

(65) Prior Publication Data
US 2016/0125014 A1   May 5, 2016

Related U.S. Application Data

(60) Provisional application No. 62/073,861, filed on Oct. 31, 2014.

(51) Int. Cl.
*G06F 16/00* (2019.01)
*G06F 11/16* (2006.01)
(Continued)

(52) U.S. Cl.
CPC .......... *G06F 11/1662* (2013.01); *G06F 11/00* (2013.01); *G06F 11/0709* (2013.01); *G06F 11/0757* (2013.01); *G06F 11/1658* (2013.01); *G06F 16/2255* (2019.01); *G06F 16/2282* (2019.01); *G06F 16/2291* (2019.01); *G06F 16/2358* (2019.01); *G06F 16/2379* (2019.01); *G06F 16/2455* (2019.01); *G06F 16/24575* (2019.01); *G06F 16/285* (2019.01); *G06F 16/9535* (2019.01); *G06Q 20/102* (2013.01); *G06F 2201/805* (2013.01); *G06F 2201/82* (2013.01); *G06Q 20/4016* (2013.01); *G06Q 40/02* (2013.01)

(58) Field of Classification Search
CPC .......................... G06F 17/3033; G06F 16/2379
USPC .......................................... 707/731, 722, 769
See application file for complete search history.

(56) References Cited

U.S. PATENT DOCUMENTS 7,523,500 B1 *   4/2009   Szor ...................... G06F 21/563
                                                            726/22
7,984,043 B1    7/2011   Waas
(Continued)

OTHER PUBLICATIONS

Oracle Coherence Documentation, Coherence Developer's Guide, "Using Cache Events," http://docs.oracle.com/cd/E15357_01/coh.360/e15723/api_events.htm#COHDG5187, accessed Dec. 1, 2016, 11 pages.

(Continued)

*Primary Examiner* — Chelcie L Daye
(74) *Attorney, Agent, or Firm* — Womble Bond Dickinson (US) LLP; Daniel E. Ovanezian

(57) ABSTRACT

A node including a memory to store data of the node and a processor coupled to the memory. The processor can receive, from a listener in a data grid system, a filter defined by search criteria of a search query. The processor can also communicate, to the listener, data from the memory that is filtered using the filter. The processor can further identify changes to the filtered data. The processor can further record, into a queue, the changes to the filtered data in the memory after the filtered data is communicated to the listener. The processor can further communicate, to the listener, the queue of changes to the filtered data.

13 Claims, 10 Drawing Sheets

(51) Int. Cl.
*G06F 16/28* (2019.01)
*G06F 16/22* (2019.01)
*G06F 16/23* (2019.01)
*G06F 16/2455* (2019.01)
*G06F 16/9535* (2019.01)
*G06F 16/2457* (2019.01)
*G06Q 20/10* (2012.01)
*G06F 11/00* (2006.01)
*G06F 11/07* (2006.01)
*G06Q 20/40* (2012.01)
*G06Q 40/02* (2012.01)

(56) References Cited

U.S. PATENT DOCUMENTS

| | | |
|---|---|---|
| 2005/0044064 A1 | 2/2005 | Haase |
| 2009/0276654 A1 | 11/2009 | Butterworth et al. |
| 2010/0262871 A1 | 10/2010 | Bain |
| 2011/0228668 A1* | 9/2011 | Pillai .................. G06F 11/2023 370/217 |
| 2012/0246190 A1* | 9/2012 | Surtani .................. G06F 16/27 707/769 |
| 2013/0262443 A1* | 10/2013 | Leida ................ G06F 16/24534 707/722 |
| 2014/0108861 A1 | 4/2014 | Abadi et al. |
| 2014/0244578 A1 | 8/2014 | Winkelstraeter |
| 2016/0026667 A1 | 1/2016 | Mukherjee |

OTHER PUBLICATIONS

GitHub, Inc., "Clustered Listeners," https://github.com/infinispan/infinispan/wiki/Clustered-listener, Sep. 25, 2014, 3 pages.

U.S. Appl. No. 14/609,329, filed Jan. 29, 2015, Fault Tolerant Listener Registration in the Presence of Node Crashes in a Data Grid.

U.S. Appl. No. 14/609,315, filed Jan. 29, 2015, Non-Blocking Listener Registration in the Presence of Data Grid Nodes Joining the Cluster.

* cited by examiner

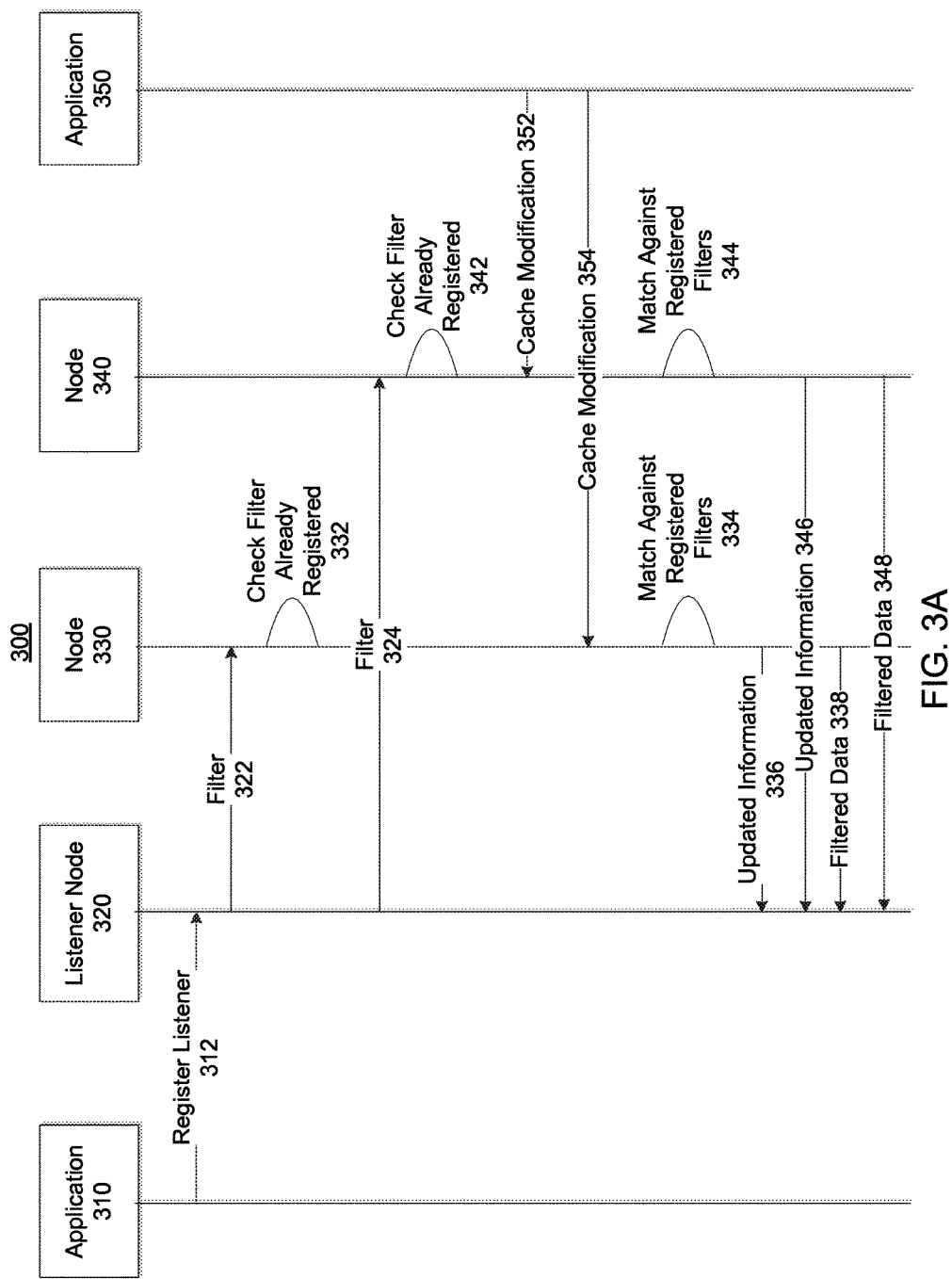

REGISTERING DATA MODIFICATION LISTENER IN A DATA-GRID

CROSS-REFERENCE TO RELATED APPLICATION

This application claims the benefit of U.S. Provisional Application No. 62/073,861, filed Oct. 31, 2014, the entire disclosure of which is incorporated herein by reference.

TECHNICAL FIELD

The present disclosure pertains to computer systems; more specifically, to transferring of data stored in the memory of computer systems.

BACKGROUND

Data, such as software programs, information, or other forms of data, has become a resource and asset for many individuals and businesses. Data can be accessed and stored at devices or nodes, such as computing devices and data centers. A data grid is a distributed database system within the boundaries of a data center that can store and manage data across multiple nodes, particularly when the amount of data is relatively large. For example, the data grid can be a collection of nodes (e.g., a node cluster) with an increased computing power and storage capacity. Database systems may use data grids to store and manage data across multiple nodes, particularly when the amount of data is relatively large. The data can be stored at different nodes in a node cluster or at different node clusters. Data grids can provide functionalities such as querying, processing for streaming data, and transaction capabilities.

BRIEF DESCRIPTION OF THE DRAWINGS

FIG. 3A depicts a sequence diagram of a method of monitoring data addition, removal, or modification in a data grid according to one embodiment.

DESCRIPTION OF EMBODIMENTS

Figure 1:
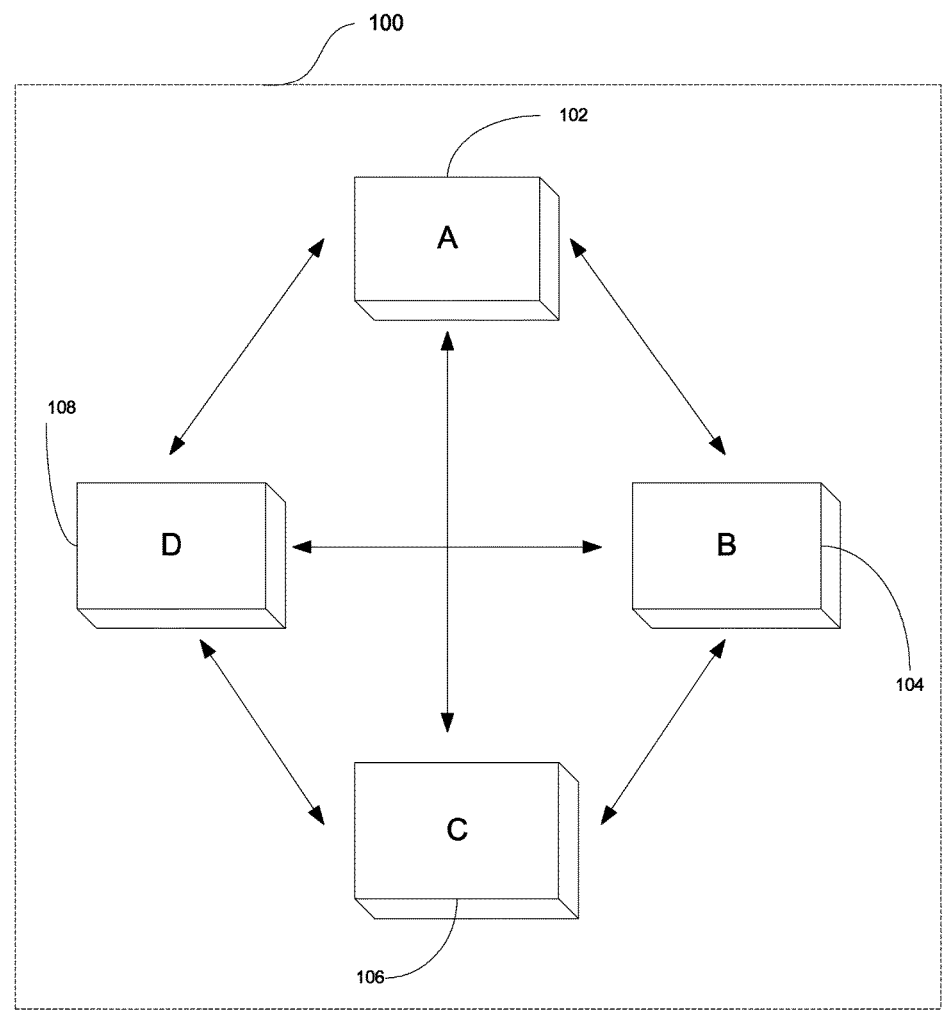
FIG. 1 illustrates a block diagram of nodes in a cluster according to one embodiment.

Data transfer technologies are described herein.

Organizations may use a data grid to store large amounts of data and/or access data owned and stored by multiple organizations. Data grids can manage distributed data, where the data can be stored across multiple locations and multiple types of storage devices. Additionally, a data grid can use a common access method, a common naming scheme, a common authentication method, a common management policy, and so forth. The data grid can be a collection of nodes (e.g., a node cluster), where each node has a memory, such as a cache, for storing data. Storing data at different nodes in a node cluster or different node clusters can provide increased data access rates and data security for the individuals or businesses. A node can be a physical machine, a virtual machine, a computer a server, a collection of physical machines or virtual machines, and so forth. When a user desires to access data in the data grid, an application can query data stored in the data grid using an iteration process, as discussed in more detail in the proceeding paragraphs. As data is queried by the application, the data can be accessed, updated, and/or modified by other applications during the iteration process.

Traditionally, when data is updated or modified at a cache of a node, providing up-to-date data to the querying application while the data is being accessed and iterated over can be difficult. In one example, traditionally when a cache entry occurs at a node during an iteration process, the cache entries can be overlooked or sent to the querying application out of order. When data is overlooked, the querying application may not receive an up-to-date data set to analyze and/or provide to a user. When data is sent to a querying application out of order, the querying application may erroneously analyze the out of order data and/or report incorrect information to a user. For example, when the querying application is for a banking application (such as fraud detection or banking account balance querying), missing data or out of order data can cause banking fraud to go undetected or an account balance to be incorrect.

Aspects of the present disclosure address the above noted deficiency by maintaining a queue of when data is updated or modified at a cache of a node during an iteration process and reporting the queued data to the querying application to maintain data order and provide up-to-date data. Maintaining a queue of changes to a cache of a node during the iteration process can track changes that occur at a location in the cache where the entries have already been iterated over during the iteration process and track when the changes occur. For example, a cache entry at the top of a cache may have initially been iterated over and a first value may have sent to a querying application. In this example, during the iteration process the cache entry at the top of the cache can be changed after the data of the cache entry was already sent to the querying application.

A queue can be maintained in order to keep track of when the new data was written, modified, or deleted in the cache. For example, the querying application may be for a bank monitoring an amount that an individual has in their bank account. In this example, as the querying application of the bank iterates over account balance information for the individual, the bank may desire to know when old account balance information was modified and/or when new banking information is added at a cache entry already iterated over at a node. When the node maintains a queue of cache entry writes, modifications, or deletions, the bank can receive the queued information and determine a correct current account balance of the individual.

FIG. 1 illustrates a block diagram of nodes 102, 104, 106, and 108 in a cluster 100. The nodes 102, 104, 106, and 108 can each include a cache for storing data. The nodes 102, 104, 106, and 108 can communicate with the other nodes 102, 104, 106, and 108, respectively, in the cluster 100. In one example, node 102 can communicate with nodes 104, 106, and/or 108 regarding the distribution of data in the data cluster, such as where different data sets should be stored or where new data should be entered.

A cache at a node can include multiple cache entries, where each cache entry includes a key and a value pair, i.e. a (key, value) pair. The (key, value) pair can include an identification (ID) value (the key) that is associated with data (the value). For example, the (key, value) pair can be an ID value associated with information about a person, e.g., (ID, Person). The (key, value) pair can be used to perform different functions at nodes in a data grid, such as data reads, data writes, or data deletions.

Figure 2A:
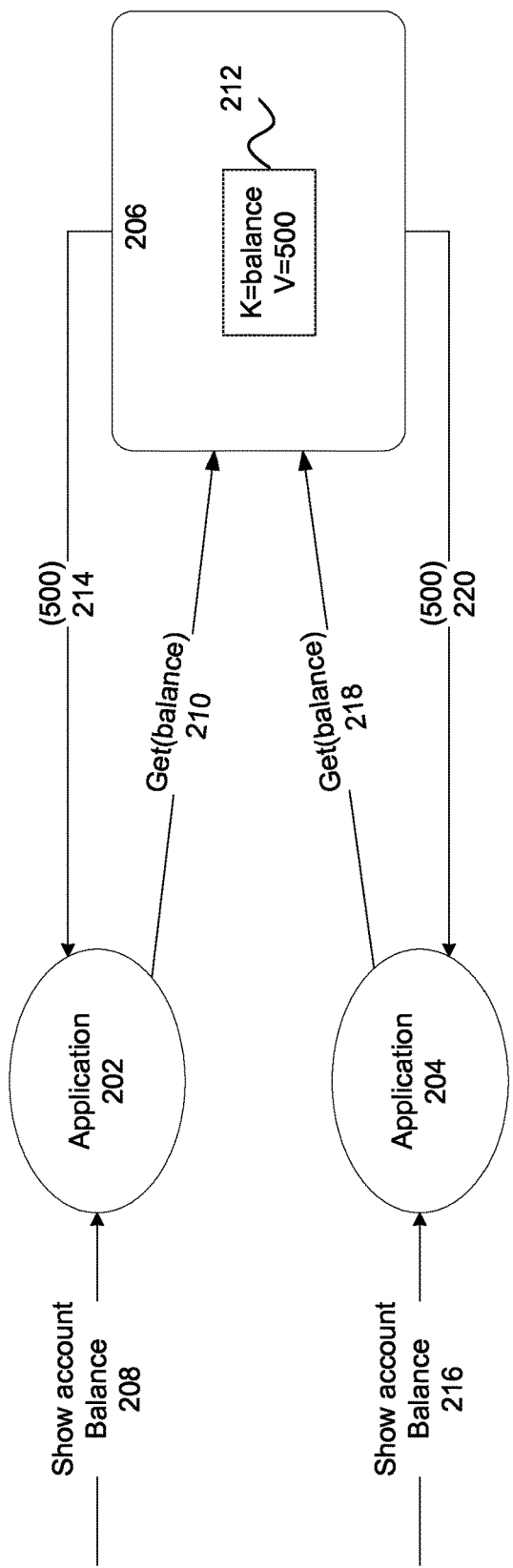
FIG. 2A illustrates applications receiving a request to retrieve data from a node cluster according to one embodiment.

FIG. 2A illustrates applications 202 and 204 receiving a request (such as a request from an ATM or a bank, e.g., a get request) to retrieve an account balance for an individual (steps 208 and 216) from a node cluster 206. FIG. 2A further illustrates that applications 202 and 204 can send read commands 210 and 218 (e.g., get(balance)) to the node cluster 206 (steps 210 and 218). The cache entries of nodes in node cluster 206 can be iterated through, and the account balance can be found at node 212 (e.g., an account balance of 500). In one example, the node 212 can communicate the account balance to the applications 202 and 204 (steps 214 and 220).

Figure 2B:
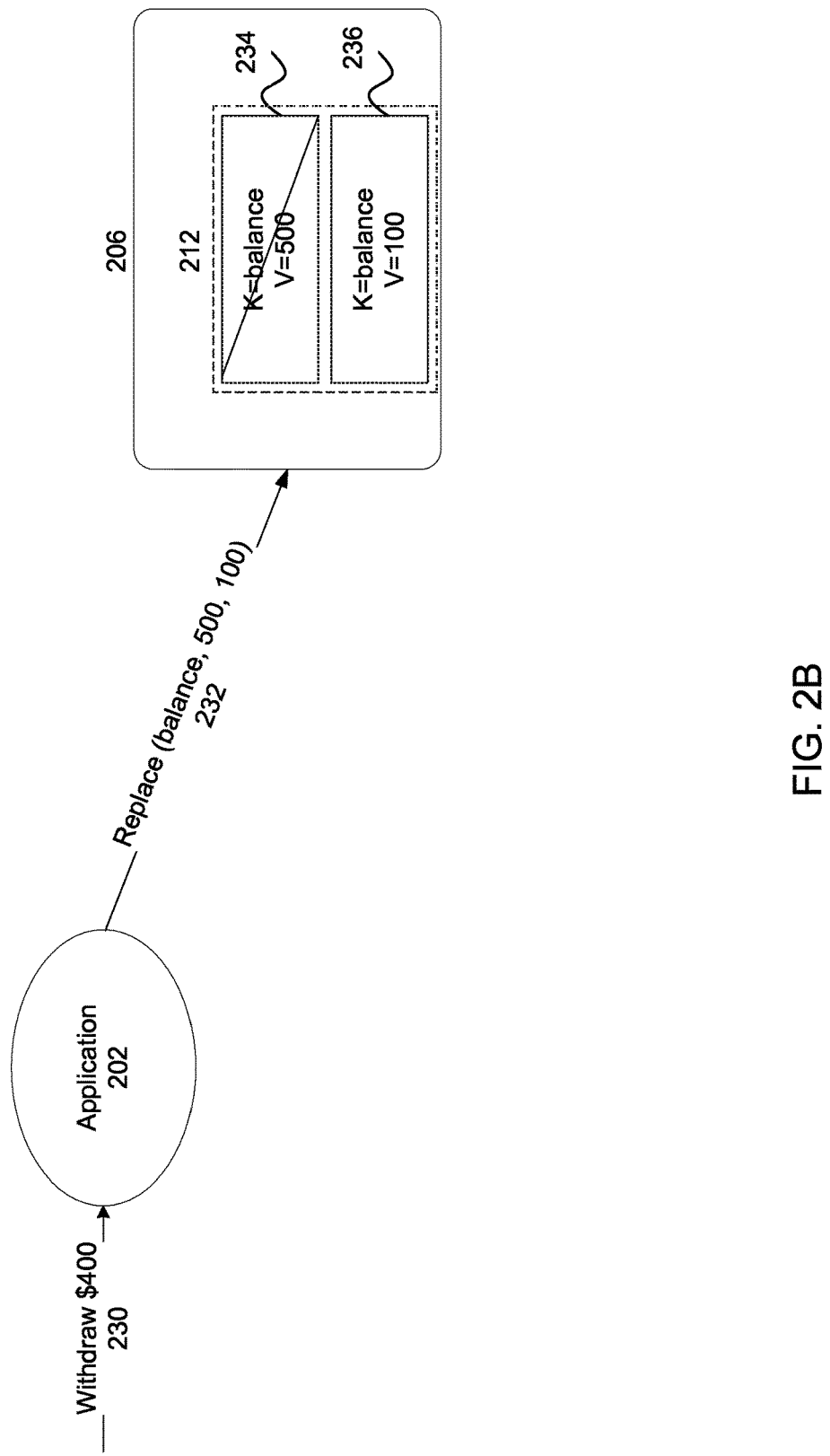
FIG. 2B illustrates an application receiving a request to modify data from a node cluster according to one embodiment.

FIG. 2B illustrates application 202 receiving a request (such as from an ATM or a bank) to withdraw an amount from an account balance for an individual (step 230) from a node cluster 206. FIG. 2B further illustrates that application 202 can send a replace command (e.g., get(balance)) to the node cluster 206 (step 232). The cache entries of nodes in node cluster 206 can be iterated through and the account balance of 500 can be found at node 212 (step 234). The account balance can be replaced with an account balance of 100 (step 236). In another example, data can be removed or deleted at a node in the cluster using a delete command, such as a delete(key) command (not shown in the figures).

To track or monitor the addition or removal of cache entries at the nodes in a cluster, modifications to the cache entries at the nodes, and so forth, listeners may be used. A listener is an application registered on a node that can be used to query for requested data. In one example, local listeners can be used in a distributed node configuration. The local listeners can be located locally at different nodes in the cluster. The local listeners can receive notifications (e.g., listen for notifications) of events or operations at the cache of a node where the local listener is registered. The events or operations can include data updates, data removal, data modification, and so forth. In one example, a local listener can be notified twice of an event or operation at the cache of the node, once before the operation is completed and once after the operation is completed. In another example, for a node with a transactional cache, the local listener can be notified when a transaction begins and notified when the transaction is completed (such as via a rollback or a commit command).

To determine what data is stored at the nodes in a cluster, the data at the caches of the nodes can be iterated through. For example, data entries of a cache can be iterated through using a consistent hash function, e.g., CH(key)->nodes. In one example, multiple caches of nodes in a cluster can be iterated through sequentially, e.g., a cache of one node can be iterated through before the cache of another node is iterated through. In another example, the caches of the multiple nodes in a cluster can be iterated through at the same time, e.g., simultaneous iteration of multiple caches. An advantage of simultaneous querying multiple nodes can be to decrease an overall query time of a cluster.

In one example, the local listeners can be local to the node where an event occurs. A data grid can include data which is stored at the caches of nodes A, B, C, D, and E (numOwners=2). The data grid can use a key (K) to select local listeners to receive activity or event notification for activities or events at selected nodes, e.g., owners(K)={A,B}. In this example, local listeners at nodes A and B can receive activity or event notifications for activities or events (such as an entry, removal, or update of data) at caches of nodes A and B related to the key K. Additionally, the local listener at node C may not receive any notifications for activities or events related to the key K.

Alternatively, a clustered listener can be used in a data grid, such as in a distributed node configuration. In one example, a clustered listener can represent a single listener installed at a listener node to receive event notifications that occur at caches of nodes in the cluster. The event notifications can include: a notification for a data entry event or a data creation event at a cache of a node in the cluster (a CacheEntryCreatedEvent notification), a notification for modification to data at the cache of the node in the cluster (a CacheEntryModifiedEvent notification), and a notification for removal of data at the cache of the node in the cluster (a CacheEntryRemovedEvent notification). Whereas local listeners in a distributed cache may only be notified of events for the cache at the node where the data resides, a clustered listener is a single listener that receives notifications (such as CacheEntryCreatedEvent notifications, CacheEntryModifiedEvent notifications, and CacheEntryRemovedEvent notifications) that occur in the different caches of the nodes in the cluster where the cluster listener is installed at the listener node.

An advantage of a cluster listener receiving event notifications that occur at caches of nodes in the cluster can be that when an iteration process, such as for a query search, is performed at a node and new data is written to the node during the iteration process, an order of the initial data and the new data can be maintained. For example, when a cluster listener is installed to monitor and query data in the cluster for credit card fraud detection, transactions for different customers can occur on a frequent basis. In this example, when a query search for possible fraudulent charges to a credit card is initiated, data can be iterated through for different caches of nodes in the cluster. While the iteration process is occurring, a new transaction may take place that relates to the query search. The cluster listener can receive an event notification when an event (such as a transaction) has occurred at the cache of a node in the cluster and maintain an order of the transaction as they occur. The cluster listener can enable a node to continuously or on a periodic basis query the node cluster.

In one example, a cluster listener can receive notifications when an operation begins and when the operation ends. In another example, a cluster listener can receive notification after the operation is completed. In another example, the cluster listener can be notified after data has been updated or modified, i.e. notifications of committed entries. In this example, the cluster listener may not receive notifications for transaction registering events (TransactionRegisteredEvent) or for transaction completed events (TransactionCompletedEvent). An advantage of the cluster listener receiving notification when the operation is completed can be to avoid a false positive of a completion of the event before the entire operation has completed.

In one example, the cluster listener can be installed at a listener node. A data grid can include numOwners=2 that run on nodes A, B, C, D, and E and a key K in the data grid, with owners(K)={A,B}. In this example, the cluster listener can be notified of events, irrespective of where the events occurred (e.g., irrespective of which node the event occurred at). For example, a cluster listener registered on node C can receive notifications of events originated by a key to add, remove, or modify data at nodes A, B, D, and/or E.

FIG. 3A depicts a sequence diagram of a method 300 of monitoring data addition, removal, and/or modification at caches of nodes in a data grid. Method 300 may be performed by processing logic that may comprise hardware (e.g., circuitry, dedicated logic, programmable logic, microcode, etc.), software (such as operations being performed by the MCU), firmware or a combination thereof. In one example, method 300 is performed by processor, a plurality of processors, a processor core, and/or a plurality of processor cores. Alternatively, other components of a computing system or software executing on the processor may perform some or all of the operations of the method 300.

Referring to FIG. 3A, the method 300 can begin by an application 310 registering or installing an iterator, e.g., a cluster listener, at a listener node 320 (step 312). In one example, the application 310 can be a web application that sends a cluster listener to the listener node 320. In another example, the application 310 can be a remote client that sends a query request. In another example, the application 310 can be aware of the topology of the cluster and select a node to install the cluster listener at. For example, the application 310 may be aware that a node in the cluster has fewer cluster listeners installed on the node than other nodes in the cluster and select the node to send the cluster listener to for installation. In another example, the application 310 may randomly select a node to send the cluster listener to.

In one example, the cluster listener can be a functional handler that accepts the results of an iteration process of nodes in a data grid. In another example, the cluster listener can include a filter, such as a data filter. The cluster listener can be notified on events in the cluster that pass or satisfy criteria of the filter.

The listener node 320 may not know what data is stored at different nodes in the data cluster. The listener node 320 can communicate the filter to node 330 in a cluster of the data grid (step 322). In one example, the node 330 can use the filter when iterating over cache entries to determine which cache entries match query criteria of the filter. In one example, the cluster in the data grid can include multiple listener nodes that communicate filters to other nodes in the cluster. The node 330 can check if the filter received from the listener node 320 has already been registered for use by another cluster listener in the cluster (step 332). In one example, the multiple listener nodes may not be aware of the other filters installed on the other nodes. For example, listener node 320 may not be aware of other filters installed by other listener nodes at node 330 but node 330 can be aware of the different filters registered at node 330. When the filter has previously been received from the other cluster listener, the node 330 may not install duplicative filters at the node, but rather use the one filter and communicate data matching the filter to both of the cluster listeners.

The listener node 320 can also communicate the filter to a node 340 in the cluster of the data grid (step 324). The node 340 can check if the filter is already registered for use by other cluster listeners in the cluster (step 342). In one example, nodes 330 and/or 340 can use the filter to map a set of nodes interested in events matching the filter, such as the filter={Listener Node 310, Node X}. In another example, nodes 330 and/or 340 can use filter parameters to determine which events should be communicated to the cluster listener.

In one example, a filter and a projector can be associated with the cluster listener to reduce network chattiness and increase a performance of the data grid. A projector can represent an application to extract information from a subset of data. In one example, the filter can select a subset of data (e.g., relevant data) for the listener. For example, a data set can include the names and ages of multiple people and the filter can select people with an age above 18 years old. In another example, the projector can extract information from the data subset (e.g., relevant bits) of the filtered data and pass the information to the cluster listener. For example, a query may be for names of people and the projector can send only the names people selected by the filter, e.g., the projector can remove the age info from the filtered data that is send to the listener. One advantage of using the filter and the projector can be to reduce network traffic by enabling nodes to communicate relevant data to the cluster listener at the node 320.

An application 350 can communicate a cache modification to the node 340 and/or node 330 in the data grid (steps 352 and 354). In one example, the cache modification can be: a cache write, such as a Put (k, v) command; a cache entry removal or deletion, such as a Delete (k, v) command; or a cache modification. In one example, the node 330 and/or the node 340 can receive multiple cache modifications at the same time. In another example, the application 350 can be aware of the topology of the cluster and select a node in the cluster to write a cache entry to. In another example, the node selection may be a specific node selection when the application is aware of where the cache entry should be written. In another example, the application may choose a node at random to write data to, and the randomly selected node can direct the data write to a node where the cache entry should be written (e.g., the node that owns the cache entry). The node that owns the cache entry can be determined by applying a consistent hash function on a key of the cache entry.

The node 330 and node 340 can monitor for cache modification or cache entry events (e.g., when data is written or modified at the cache of the node 330 or 340) and determine when a cache entry event occurs that matches a filter registered at node 330 and/or node 340 (steps 334 and 344). In one example, on the node 330 and/or 340, when data matches the filter, a projector can extract information from the subset of data. Node 330 or node 340 can communicate the data from the cache entry event to the listener node 320 when the cache entry event occurs that matches the filter (steps 336 and 346). Node 330 or node 340 can also communicate the filtered data to the listener at the listener node 320 during the iteration process (steps 338 and 348). In another example, the node 330 or node 340 can also communicate the filtered data to the listener at the listener node 320 after the iteration process. In another example, the listener of the listener node 320 may cache the results of a query.

Figure 3B:
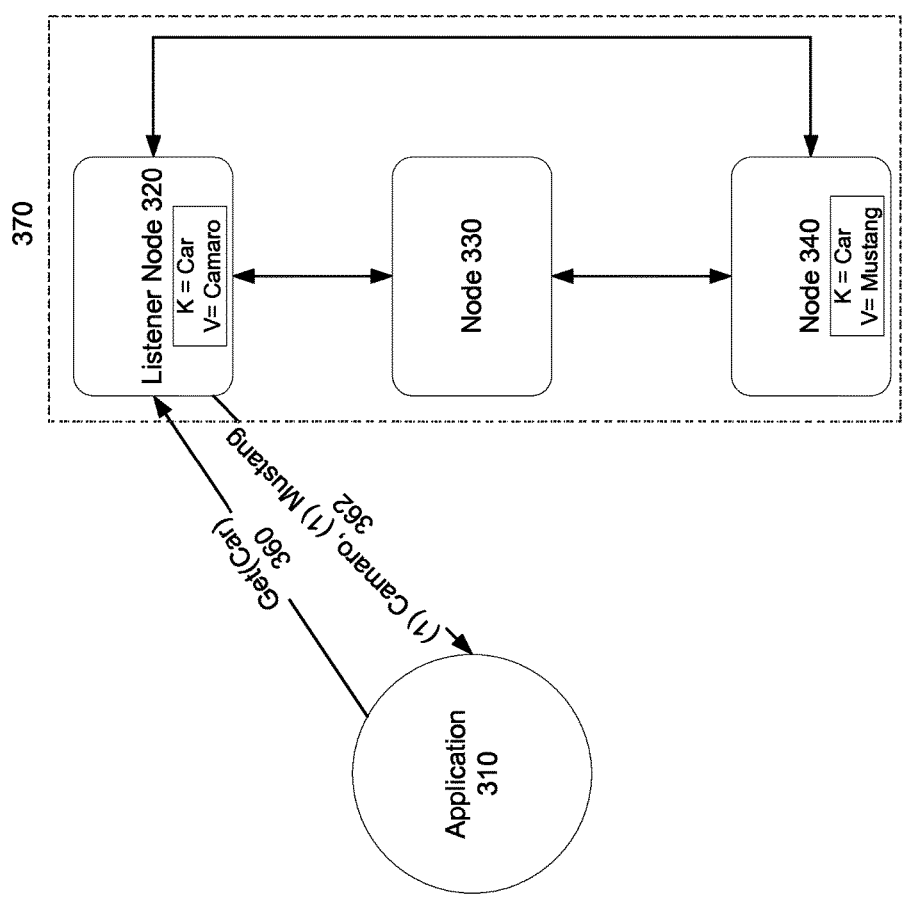
FIG. 3B illustrates an application performing a query in cluster of a data grid according to one embodiment.

FIG. 3B illustrates an application 310 performing a query in cluster 370 of a data grid. Application 310 can send a listener (step 360) to a listener node 320 in the cluster 370.

In one example, the listener can be for a query or search request and include query or search criteria, such as a request to query for car data in the cluster 370. The listener node 320 can receive the listener and register the listener at the listener node 320. In one example, nodes 320, 330, and 340 can be interconnected and communicate requests and information between the nodes 320, 330, and 340. As discussed in the preceding paragraphs, an iteration process can be performed at the nodes 320, 330, and 340 of the cluster 370 to find the car data. When the nodes 320, 330, and 340 are queried, nodes 320 and 340 can include cache entries with car data, e.g., data for a Mustang and for a Camaro. The listener at the listener node 320 can receive the car data and communicate the car data to the application 310 (step 362).

Figure 3C:
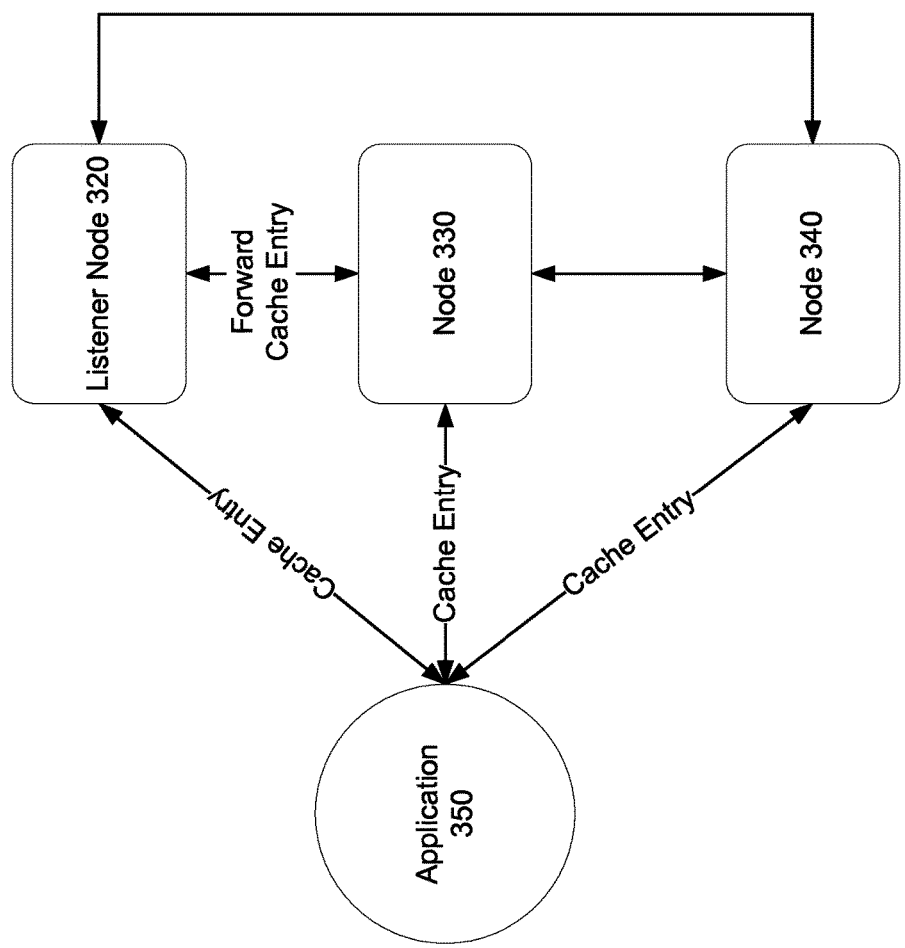
FIG. 3C illustrates an application modifying a cache of nodes according to one embodiment.

FIG. 3C illustrates an application 350 modifying caches of nodes 320, 330, and/or 340 in a cluster. In one example, the application can send data to a listener node 320 in the cluster (e.g., a cache entry command) and the listener node 320 can forward the data to node 330 in the cluster. In another example, the application 350 can send data to node 330 or 340 in the cluster and the node 330 or 340 can forward the information to node 320, 330, or 340, respectively. An advantage of the application 350 being able to send the data to a node 320, 330, or 340 in the cluster and the node 320, 330, or 340 forwarding the data to another node 320, 330, or 340, respectively, can be to enable an application to send data to a cluster without knowing an actual cluster topology or an actual cache entry location that the data may be entered in a cache of a node in the cluster. In another example, the application 350 can send data to nodes 320, 330, and/or 340 directly. An advantage of sending the data to the nodes 320, 330, and/or 340 directly can be to reduce bandwidth usage and increase data communication efficiency.

Figure 4:
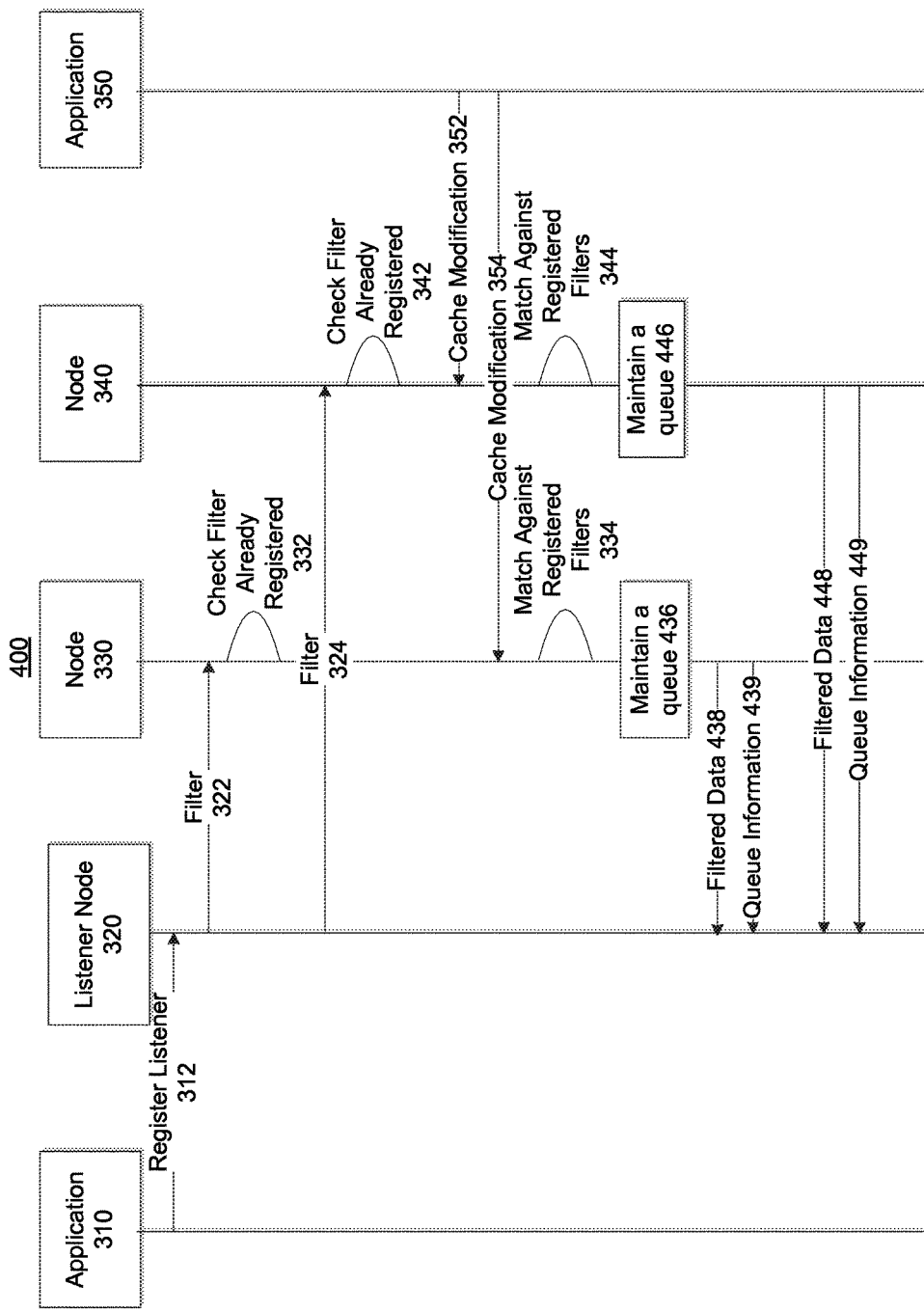
FIG. 4 depicts a sequence diagram of a method of monitoring data addition, removal, and/or modification in a data grid according to one embodiment.

FIG. 4 depicts a sequence diagram of a method 400 of monitoring data addition, removal, and/or modification in a data grid. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by processor, a plurality of processors, a processor core, and/or a plurality of processor cores. Alternatively, other components of a computing system or software executing on the processor may perform some or all of the operations of the method 400.

Referring to FIG. 4, the method 400 is the same as the method discussed in the preceding paragraphs for FIG. 3 through the step of nodes 330 and 340 monitoring for cache entry events to determine when a cache entry event occurs that matches a filter registered at node 330 and/or node 340 (steps 334 and 344). When node 330 or node 340 determines that a cache entry event has occurred that matches the filter, node 330 and node 340 can maintain queues of the cache entry events that have occurred that match the filters registered at node 330 or node 340, respectively (steps 436 and 446). The node 330 or the node 340 can then communicate the filtered data to the listener at the listener node 320 (steps 438 and 448). When the nodes 330 and 340 in the data grid have completed an iteration process, the nodes 330 and 340 can communicate the cache entry events that are queued at the nodes 330 and 340, respectively (steps 439 and 449).

In one example, node 330 can finish iterating through the cache entries at the node 330 and communicate the filtered data and the queued data at a first time. In another example, node 340 can finish iterating through the cache entries at the node 340 and communicate the filtered data and queued data at a second time. In another example, nodes 330 and 340 can communicate the filtered data and the queued data at the same time. In another example, the filtered data can be sent in a first message and the queued data can be sent in a second message. In another example, the filtered data and the queued data can be sent in the same message.

In one example, after the iteration process has completed and the filtered data and queued data have been sent to the listener at the listener node 320, the filter may remain at the nodes 330 and 340, e.g., the filter is not uninstalled. When new cache entries are added, modified, or removed from the cache of node 330 or 340, the filter at node 330 or 340 can determine when the newly written cache entries match the filter. When the new cache entries match the filter at node 330 or 340, the filter can notify the listener at listener node 320 directly of the matching cache entries, e.g., without having to maintain a queue. In this example, the queue may be maintained while the initial iteration process takes place and after the iteration process is finished, the filter can send the cache entry information write to the listener directly.

Traditionally, when cache entries occur at a node during an iteration process, the cache entries were overlooked or sent to a querying application out of order. An advantage of maintaining a queue of changes to a cache of a node during the iteration process can be to track changes that occur at a location in the cache where the entries have already been iterated over during the iteration process. In one example, a credit card company can monitor for fraud detection. In this example, cache entries at a node in a cluster can be iterated through multiple times using the same or different filters. Additionally, customers of the credit card company can use their credit cards frequently, causing multiple transactions to be written into cache entries of a node on a regular or frequent basis. A listener may be installed by a first application for the credit card company to detect fraud, e.g., monitor the transactions of users to detect possibly fraudulent transactions. A second application for stores where customers purchase items can write data to a cache of a node. As the node iterates through the cache entry in view of a query search from the first application to monitor for fraudulent credit card charges, the node can maintain a queue of the cache entries (credit card transactions) from the second application to enable the credit card company to determine when cache entries were added, modified, or removed.

Figure 5:
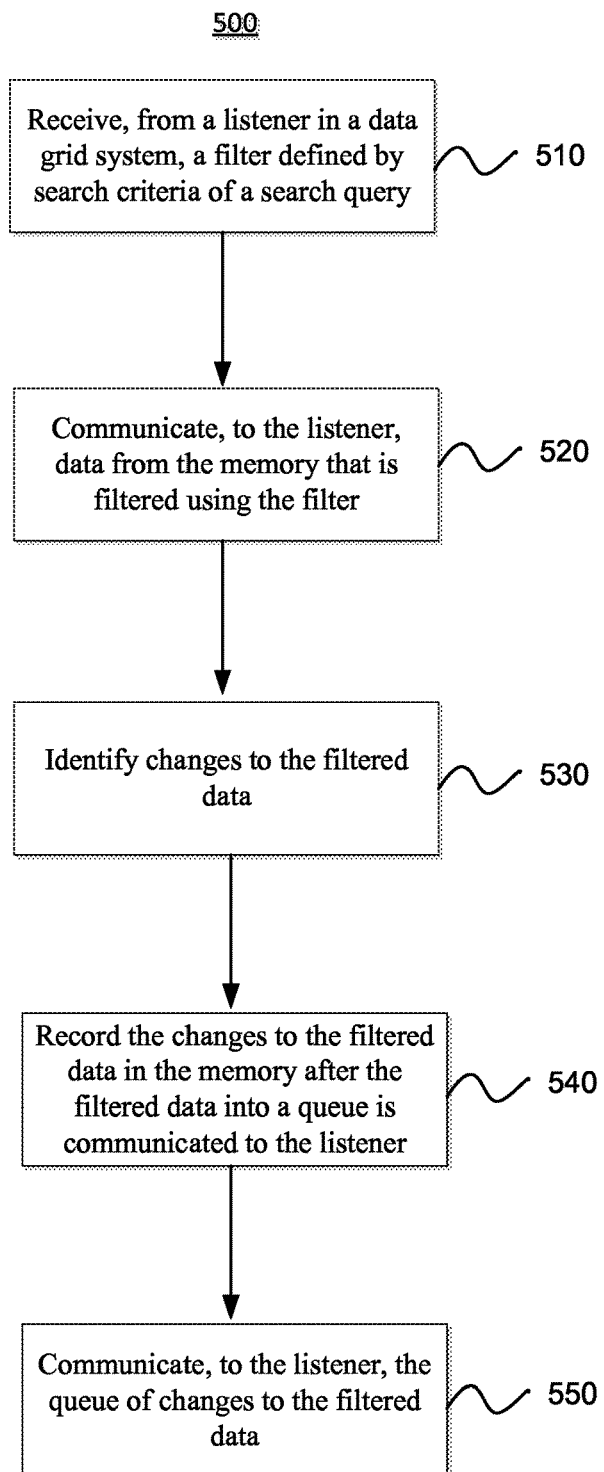
FIG. 5 is a flow diagram of a node communicating information in a data grid system according to one embodiment.

FIG. 5 depicts a flow diagram of a node communicating information in a data grid system. The processing device can include a memory and a processor. In one example the memory can store data. In another example, the processor can receive, from a listener in a data grid system, a filter defined by search criteria of a search query (block 510). The processor can communicate, to the listener, data from the memory that is filtered using the filter (block 520). The processor can identify changes to the filtered data (block 530). The processor can record, into a queue, the changes to the filtered data in the memory after the filtered data is communicated to the listener (block 540). The processor can communicate, to the listener, the queue of changes to the filtered data (block 550).

In one example, the listener can maintain a complete list of the changes to filtered data in the memory of the node. In another example, the changes to the filtered data can include data written to the node in the data grid system and filtered by the filter or the filtered data modified at the node in the data grid system. In another example, the processor can further determine when the received filter has previously been installed or registered at the processing device. In another example, the processor can further filter data in the memory that matches the filter from the listener.

Figure 6:
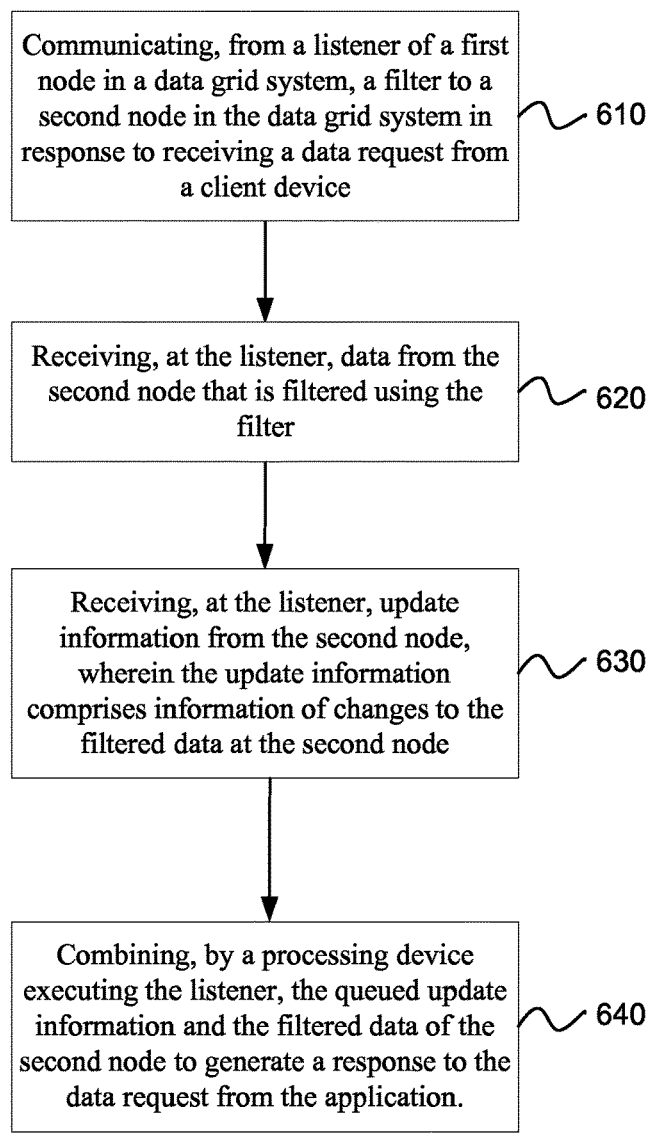
FIG. 6 is a flow diagram of a method of communicating information to a listener in a data grid system according to one embodiment.

FIG. 6 depicts a flow diagram of a method 600 of communicating information in a data grid system. Method 600 may be performed by processing logic that may comprise hardware (e.g., circuitry, dedicated logic, programmable logic, microcode, etc.), software (such as operations being performed by the MCU), firmware or a combination thereof. In one example, method 600 is performed by processor, a plurality of processors, a processor core, and/or a plurality of processor cores. Alternatively, other components of a computing system or software executing on the processor may perform some or all of the operations of the method 600.

Referring to FIG. 6, the method 600 begins by communicating, from a listener of a first node in a data grid system, a filter to a second node in the data grid system in response to receiving a data request from an application (block 610). The method can further include receiving, at the listener, data from the second node that is filtered using the filter (block 620). The method can further include receiving, at the listener, queued update information from the second node (block 630). In one example, the queued update information comprises information of changes to the filtered data maintained in a queue at the second node. The method can further include combining, by a processing device executing the listener, the queued update information and the filtered data of the second node to generate a response to the data request from the application (block 640).

In one example, the method can further include combining, by a processing device executing the listener, the queued update information to a list of the changes received from other nodes in the cluster. In another example, the method can further include receiving, from a processing device, the listener and registering the listener at the first node. In another example, the method can further include communicating, from the listener of the first node in a data grid system, a projector to a second node in the data grid system, where the filter can select a subset of data in a memory of the second node and the projector extracts information from the subset of data.

In one example, the update information can include a queue of changes to the filtered data at the second node. In another example, the update information can be a queue of changes to the filtered data after the filtered data is received at the listener. In another example, the queued update information can include an indication of data that is written to the second node and is filtered using the filter and an indication of filtered data that is modified at the second node after the filtered data is received at the listener. In another example, the method can include communicating the filter to a plurality of nodes in the data grid system.

Figure 7:
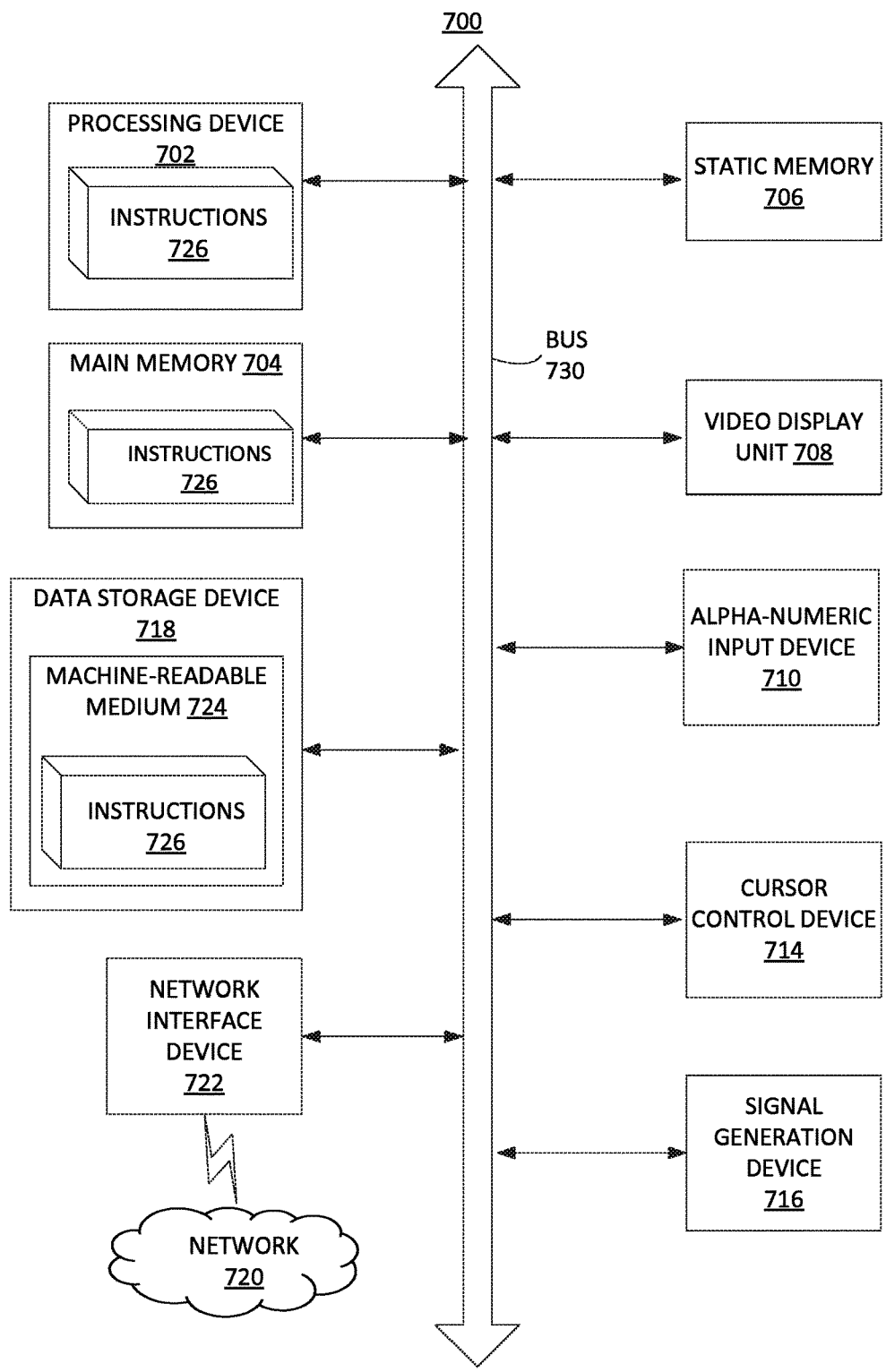
FIG. 7 illustrates a block diagram of one implementation of a computer system.

FIG. 7 illustrates a diagrammatic representation of a machine in the exemplary form of a computer system 700 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 728. The computer system 700 also may include a video display unit 708 (e.g., a liquid crystal display (LCD), a cathode ray tube (CRT), or a touch screen), an alphanumeric input device 710 (e.g., a keyboard), a cursor control device 712 (e.g., a mouse), and a signal generation device 714 (e.g., a speaker).

The data storage device 716 may include a machine-readable storage medium 718 on which is stored one or more sets of instructions 726 (e.g., software) embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable storage media. The instructions 726 may further be transmitted or received over a network 720 via the network interface device 728.

While the machine-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   communicating, from a listener of a first node in a data grid, a filter to a second node in the data grid in response to receiving a data request from an application;
   communicating, from the listener of the first node in the data grid system, a projector to the second node in the data grid system, wherein the filter selects a subset of data in a memory of the second node and the projector extracts information from the subset of data;
   receiving, at the listener, data from the second node that is filtered using the filter;
   receiving, at the listener, queued update information from the second node, wherein the queued update information comprises information of changes to the filtered data maintained in a queue at the second node; and
   combining, by a processing device executing the listener, the queued update information and the filtered data of the second node to generate a response to the data request from the application.

2. The method of claim 1, further comprising combining, by the processing device executing the listener, the queued update information to a list of the changes received from other nodes in a cluster of the data grid.

3. The method of claim 1, further comprising:
   receiving, from the application, the listener; and
   registering the listener at the first node.

4. The method of claim 1, wherein the update information comprises a queue of changes to the filtered data at the second node.

5. The method of claim 1, wherein the update information is a queue of changes to the filtered data after the filtered data is received at the listener.

6. The method of claim 1, wherein the queued update information comprises:
   an indication of data that is written to the second node and is filtered using the filter; and
   an indication of filtered data that is modified at the second node after the filtered data is received at the listener.

7. The method of claim 1, further comprising communicating the filter to a plurality of nodes in the data grid system.

8. A non-transitory computer-readable storage medium, having instructions stored therein, which when executed, cause a processing device to execute operations comprising:
   receive, from a listener in a data grid system, a filter defined by search criteria of a search query;
   communicate, to the listener, data from a memory that is filtered using the filter;

receive, from the listener, a projector, wherein the filter selects a subset of data in a memory associate with the processing device and the projector extracts information from the subset of data;

identify changes to the filtered data;

record, by the processing device, the changes to the filtered data into a queue in a memory after the filtered data is iterated over; and communicate, to the listener, the queue of changes to the filtered data.

9. The non-transitory computer-readable storage medium of claim 8, wherein the changes to the filtered data occur after the filtered data is communicated to the listener.

10. The non-transitory computer-readable storage medium of claim 8, the operations further to determine when the filter has been received from another node in a cluster of the data grid.

11. The non-transitory computer-readable storage medium of claim 8, the operations further comprising receiving from an application a modification to the memory, wherein the modification can be an entry of data in the memory, a change of data in the memory, or a deletion of data in the memory.

12. The non-transitory computer-readable storage medium of claim 8, wherein:

the queue of changes to the filtered data is communicated at the same time as the filtered data or in a single message; or the queue of changes to the filtered data is communicated after the filtered data is communicated.

13. The non-transitory computer-readable storage medium of claim 8, wherein the listener maintains a complete list of the changes to filtered data in the memory of the node.

* * * * *